United States Patent [19]
Aref et al.

[11] Patent Number: 6,023,720
[45] Date of Patent: Feb. 8, 2000

[54] SIMULTANEOUS PROCESSING OF READ AND WRITE REQUESTS USING OPTIMIZED STORAGE PARTITIONS FOR READ AND WRITE REQUEST DEADLINES

[75] Inventors: Walid G. Aref, New Brunswick; Ibrahim Kamel, Monmouth Junction, both of N.J.; Thirumale N. Niranjan, Pittsburgh, Pa.; Shahram Ghandeharizadeh, Los Angeles, Calif.

[73] Assignee: Matsushita Electric Industrial Co., Ltd., Osaka, Japan

[21] Appl. No.: 09/020,883

[22] Filed: Feb. 9, 1998

[51] Int. Cl.$^7$ ..................................................... G06F 13/18
[52] U.S. Cl. ........................... 709/103; 711/156; 711/158; 710/44
[58] Field of Search ................................... 711/1, 4, 111, 711/112, 150, 151, 153, 156, 158, 160, 167, 168, 172, 173; 370/395; 709/102, 103, 219, 231; 710/23, 25, 28, 38, 40, 43, 44, 52, 58

[56] References Cited

U.S. PATENT DOCUMENTS

| | | | |
|---|---|---|---|
| 5,535,202 | 7/1996 | Kondoh | 370/395 |
| 5,907,683 | 5/1999 | Engelsiepen et al. | 709/231 |
| 5,944,792 | 8/1999 | Yamato et al. | 709/219 |

FOREIGN PATENT DOCUMENTS

56-036746  4/1981  Japan.
5-334141  12/1993  Japan.

*Primary Examiner*—B. James Peikari
*Attorney, Agent, or Firm*—Harness, Dickey & Pierce, P.L.C.

[57] ABSTRACT

The disk scheduling system supports the processing of simultaneous storage device read and write requests in a video server environment, thereby supporting both video-on-demand and non-linear editing applications. Read requests are the result of movie viewing, while write requests are the result of video clip editing or movie authoring procedures. Due to real-time demands of movie viewing, read requests have to be fulfilled within certain deadlines, otherwise they are considered lost. Since the data to be written into the storage device is stored in main memory buffers (or write buffers), write requests can be postponed until critical read requests are processed. However, write requests still have to be proceeded within reasonable delays and without the possibility of indefinite postponement. This is due to the physical constraint of the limited size of the main memory buffers. The new process treats both read and write requests in a homogenous manner in order to ensure that the deadlines are met and avoids indefinite postponement and large buffer sized in the case of storage device writes utilizing a single queue of requests.

15 Claims, 4 Drawing Sheets

SIMULTANEOUS PROCESSING OF READ AND WRITE REQUESTS USING OPTIMIZED STORAGE PARTITIONS FOR READ AND WRITE REQUEST DEADLINES

BACKGROUND OF THE INVENTION

1. Field of the Invention

The present invention relates to a new disk scheduling algorithm for supporting simultaneous read and write requests that are made by a user in the presence of real-time requirements and high bandwidth demands.

2. Description of Background Art

During the past few years, systems that enable a user to manipulate the content of a video database have gained increase popularity. These systems, referred to as non-linear editing systems, are widely applied in the entertainment industry where the underlying storage server must be able to concurrently record a live broadcast feed, modify pre-recorded data, and broadcast an authored presentation. While most of these non-linear editing systems are currently analog, products providing support for digital editing continue to emerge.

An important component of a digital editing system is the multimedia storage server that can display and record digital video. The design complexity of such a storage server arises because of the wide range of activities in which clients and applications may participate. For instance, consider an editing system employed by a TV news organization. While the live telecast of the Olympic games is in progress, editors have to record and monitor the program in order to identify the highlights that can be used in later broadcasts, and editors at different sites may be concurrently performing editing operations on different clips. For example, any one editing station may be responsible for the swimming events and another station for gymnastics. Thus, the storage server would be responsible for writing the digital data which is provided from a camera, reading on-disk data for reviewing by the editors, updating on-disk data as a result of an editing operation such as a cut-and-paste, and reading on-disk data for broadcasting or video viewing.

Due to these real-time demands of video viewing, requests to read stored data have to be fulfilled within certain deadlines, otherwise they are considered lost. However, since data that is to be written onto a storage disk is originally stored in main memory buffers (or write buffers), write requests can be postponed until critical read requests are processed. But, write requests still have to be processed within a reasonable time and without the possibility of indefinite postponement. This is a result of the physical constraint of the main memory buffers size.

In view of the foregoing, it is desirable to minimize the amount of disk reads that do not meet their presentation deadlines, and to avoid indefinite postponement and large buffer sizes in the case of disk writes. Furthermore, since seek time is the most time consuming part of retrieving a page from a disk, it is desirable to improve the throughput of the storage server by enhancing the utilization of available disk bandwidth.

SUMMARY OF THE INVENTION

The present invention provides an apparatus, article of manufacture and method of supporting the processing of simultaneous read requests and write requests of a storage device in the presence of real-time requirements that are associated with these requests. The method includes constructing a storage device data structure with a plurality of partitions that correspond to a plurality of seek paths, with the storage device data structure storing both read and write requests. The read requests are assigned read request deadlines based at least in part on a user-desired response time for handling the read request. The write requests are assigned write request deadlines based at least in part on the capacity of the write buffer. The write buffer stores data associated with write requests until the data is written to the storage device. The read and write requests are placed within the storage device data structure such that an optimal seek path is maintained for each of the plurality of partitions while minimizing violations of the read and write request deadlines.

Further scope of applicability of the present invention will become apparent from the detailed description given herein. However, it should be understood that the detailed description and specific examples, while indicating preferred embodiments of the invention, are given by way illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limited on the present invention, and wherein.

DETAILED DESCRIPTION OF THE PREFERRED EMBODIMENT(S)

The present invention relates to disk scheduling for simultaneous read and write requests in the presence of real-time requirements of video viewing and editing applications. Both of these applications has its own system requirements. Our focus here is on the disk scheduling requirements. For example, from the disk's point of view, video-on-demand applications issue read-only requests to the disk, while video editing applications issue both read and write requests. Moreover, some applications may issue read and/or write requests that may or may not have real-time deadlines.

The Nature of Deadlines

For video-on-demand, each read request typically has to be fulfilled within a given deadline, but some applications may allow a portion of the read or write requests to be lost by the system, i.e., the requests are not serviced or fulfilled by the disk. For example, some frames can be lost during video viewing due to congestion in the disk.

More formally, from a disk scheduling point of view, disk read and write requests can be classified as belonging to one of four categories, where each category has different requirements and is useful for a certain class of applications. These Categories are 1. dl requests: these are read or write requests that have deadlines and the request may be lost in the case of contention. Read and write requests of this category are referred to as $R_{dl}$ and $W_{dl}$ requests, respectively.

2. dn requests: these are read or write requests that have deadlines and the requests may not be lost (non lossy) regardless of the contention in the system. Read and write requests of this category are referred to as $R_{dn}$ and $W_{dn}$ requests, respectively.

3. nl requests: these are read or write requests that have no deadlines and the request may be lost in case of contention. Read and write requests of this category are referred to as $R_{nl}$ and $W_{nl}$ requests, respectively.

4. nn requests: these are read or write requests that have no deadlines and the requests may got be lost (non lossy) regardless of the contention in the system. Read and write requests of this category are referred to as $R_{nn}$ and $W_{nn}$ requests, respectively.

Different disk scheduling procedures need to be designed for each of these request categories. Requests belonging to the nl category (whether $W_{nl}$ or $R_{nl}$), can always be delayed until processed because there are no deadlines. Therefore, the system should avoid losing them, as they can afford to wait until serviced. As a result, $W_{nl}$ and $R_{nl}$ requests are treated as $W_{nn}$ and $R_{nn}$, requests, respectively, and they will never be lost. For this reason, the scheduling techniques for only the dl, dn and nn categories are expressly considered herein. The system allows simultaneous support of video editing and video-on-demand applications including $R_{dl}$ requests, which comprise most of the video-on-demand accesses, and $R_{nn}$ and $W_{nn}$ requests, which comprise most of the editing-oriented accesses. It should also be understood that this invention may be easily extended to handle $R_{dn}$, $W_{dl}$, and $W_{dn}$ requests as well.

Example of Video Server Architecture

Figure 1:
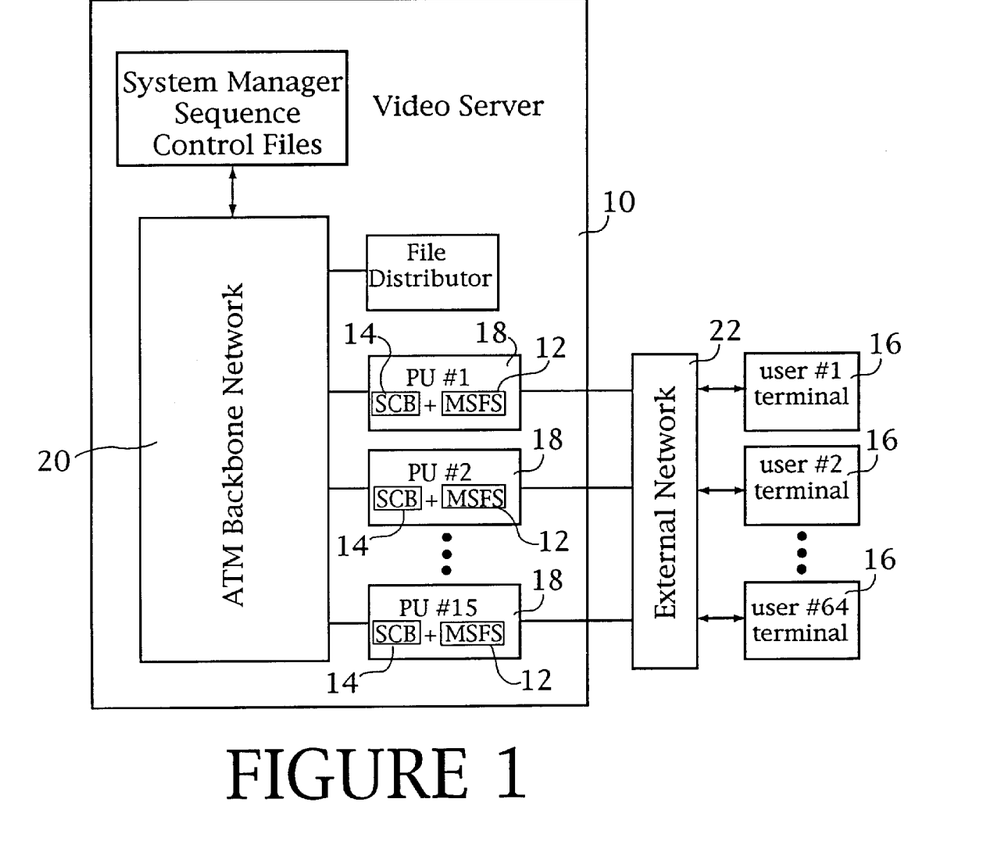
FIG. 1 is the video server architecture used in conjunction with the present invention.

The present invention may be practiced on a video server architecture that was originally proposed in "A File System for Continuous Media" at The *Fifth International Workshop on Multi-Media Communication*, pgs. 341–346, May 1994, which is herein incorporated by reference. The main components of this architecture are shown in FIG. 1.

The video server 10 supports MPEG-encoded (compressed) video streams. Each stream is broken into fixed-length pieces, termed media segment file (MSF) blocks. The MSF blocks for a given video stream are stored distributively throughout the whole file system. The file system has multiple disk storage servers, where each storage server is termed a Media Segment File Server (MSFS) 12.

The MSFS 12 stores MSF blocks that belong to a variety of video streams. In order to retrieve the video in the correct order, a Sequence Control Broker (SCB) 14 stores an ordered list of pointers to all the MSF blocks of a video stream. The SCB 14 acts on behalf of users to maintain a video playback stream. Each SCB 14 can simultaneously support more than one user terminal 16, (e.g., 64 users). The number of user terminals 16 connected to one SCB 14 is predetermined so that the overall system guarantees continuous video playback for all the users.

In the initialization of a video playback session, the SCB 14 fetches the list of pointers for a requested video. During the playback, the SCB 14 sends a read request to the MSFS 12 on behalf of the user such that uninterrupted service is guaranteed. The SCB 14 is also responsible for handling virtual video cassette recorder (VCR) requests, e.g., fast forwarding and rewinding.

The SCB 14 and the MSFS 12 are built into one main building block, termed a video Processing Unit (PU) 18. In one video server, there can be multiple PU units (e.g., 15 units). Each SCB 14 can directly access the data that locally resides in its corresponding MSFS 12. However, MSF blocks are stored across other MSFs 12, and the SCB 14 needs to access the MSFs 12 of the other processing units 18.

In order for the PUs 18 to communicate, they are all connected to an asyncronous transfer mode (ATM) switch 20. An SCB 14 may use the ATM switch 20 to retrieve a MSF block that is distributed across the MSFs 12 which reside in multiple PUs 18. The ATM switch 20 provides a mesh network that guarantees a connection from each SCB 14 in the system to all of the MSFSs 12.

The SCBs 14 are also connected to an external network 22 that connects the video server 10 to the end users 16. Users 16 are connected to the external network 22 by using set-top boxes that have the following functions: decoding MPEG-encoded video data, providing user interface for virtual VCR requests and communicating with the SCBs 14.

A Review of Disk Scheduling Concepts

In video-on-demand applications, read requests are the result of users demanding to view a certain movie or a video clip at a certain time. Once admitted to the system, the user is guaranteed a certain Quality Of Service (QOS). This is expressed in terms of viewing a continuous stream of frames where the rate of frame loss is very low and is not noticed by the viewer. Frame losses are possible due to many reasons. Of specific concern are the losses due to congestion of the disk in the MSFSs 12.

Each read request to the disk has a real-time deadline. The MSFS 12 decides whether the disk can fulfill the request within this deadline. Based on this decision, the read request is either accepted or rejected. In the latter case, the page corresponding to the rejected read request is considered lost.

Seek time is the most time-consuming part of disk retrieval. One purpose of disk scheduling algorithms is to reduce this seek time. This can be achieved by queuing and ordering the disk access requests so that seek time is minimized.

Process SCAN is one of the traditional disk scheduling algorithms that attempts to minimize seek time. (See, *Operating System Concepts*, 4th Edition. A. Silberschatz and P. B. Galvin. Addison-Wesley, 1994.) In SCAN, the disk head moves in one direction (either inward or outward) and services the disk requests whose cylinder falls where the disk head is currently positioned. Once the disk head reaches the high cylinder position, it reverses direction and services the disk requests which happen to lie along the new path. If real-time requirements are involved, SCAN is modified to meet the real-time considerations.

Process SCAN-RT (SCAN with Real Time considerations) is a modified version of SCAN. SCAN-RT services disk requests in SCAN order, and inserts new requests in SCAN order provided that the real-time requirements of the disk requests already existing in the queue are not violated by the insertion. If the insertion of the new request in SCAN order causes other requests already present in the disk queue to miss their deadlines, then the new request is inserted at the end of the queue. At this time, it is determined if the newly inserted disk request can be serviced in time to meet its own deadline. If the request cannot be inserted to meet its own deadline, the request is discarded and considered lost.

Minimizing seek time alone may not be sufficient. In some instances, the user must be guaranteed that the data will be delivered at the specified time, with losses low enough that dropped frames will not be noticeable. Although delays in data delivery may occur for various reasons, there are times in which a disk scheduling algorithm must actively participate in maintaining the guaranteed QOS.

An Earliest-Deadline-First (EDF) algorithm addresses this issue without trying to optimize the disk bandwidth utilization, thus limiting the capacity of the server. Process SCAN-EDF is another modified version of SCAN that uses an EDF process. As with the SCAN-RT algorithm, the SCAN-EDF algorithm attempts to order real-time constraints without unduly affecting bandwidth utilization. SCAN-EDF processes requests according to their deadlines, just like EDF and requests with the same deadlines are serviced in SCAN order. If all of the requests have distinct deadlines, SCAN-EDF degenerates to EDF. On the other hand, if all the requests have the same deadline, SCAN-EDF behaves similarly to SCAN.

While it has been recognized that a real-time scheduling algorithm must be used to process read requests, a scheduling algorithm has not heretofore been developed to successfully handle disk write requests in conjunction with disk read requests. The lack of an application-specified deadline precludes the use of a real-time scheduling algorithm for writes. One possible solution which has been presented is to maintain two separate queues, one queue for reads and a second queue for writes. The read requests are scheduled using any of the above algorithms, e.g., SCAN-EDF, SCAN-RT, etc. Each write request is associated with a fixed time-out. A write is issued to the disk either when (1) it does not violate the deadlines of the pending write requests; (2) the write buffer is full (or almost full); or (3) a fixed write time-out expires.

This solution has been found to have several drawbacks. First, batching a large number of writes to increase the disk bandwidth utilization (by reducing seek time) may lead to either an increased likelihood of the system violating the deadline of newly arrived read requests or starvation of the write requests. Also, interrupting the SCAN order of currently existing reads to schedule writes may increase the average seek time and lower disk utilization. This increases the overall delay of read requests at the server, leading to a reduction in QOS, as observed by the application. Therefore, the present invention presents a technique that treats read and write requests in a homogenous manner, and assigns a deadline to the write requests in order to maintain a single queue.

Homogenous Handling of Read and Write Requests

Figure 2:
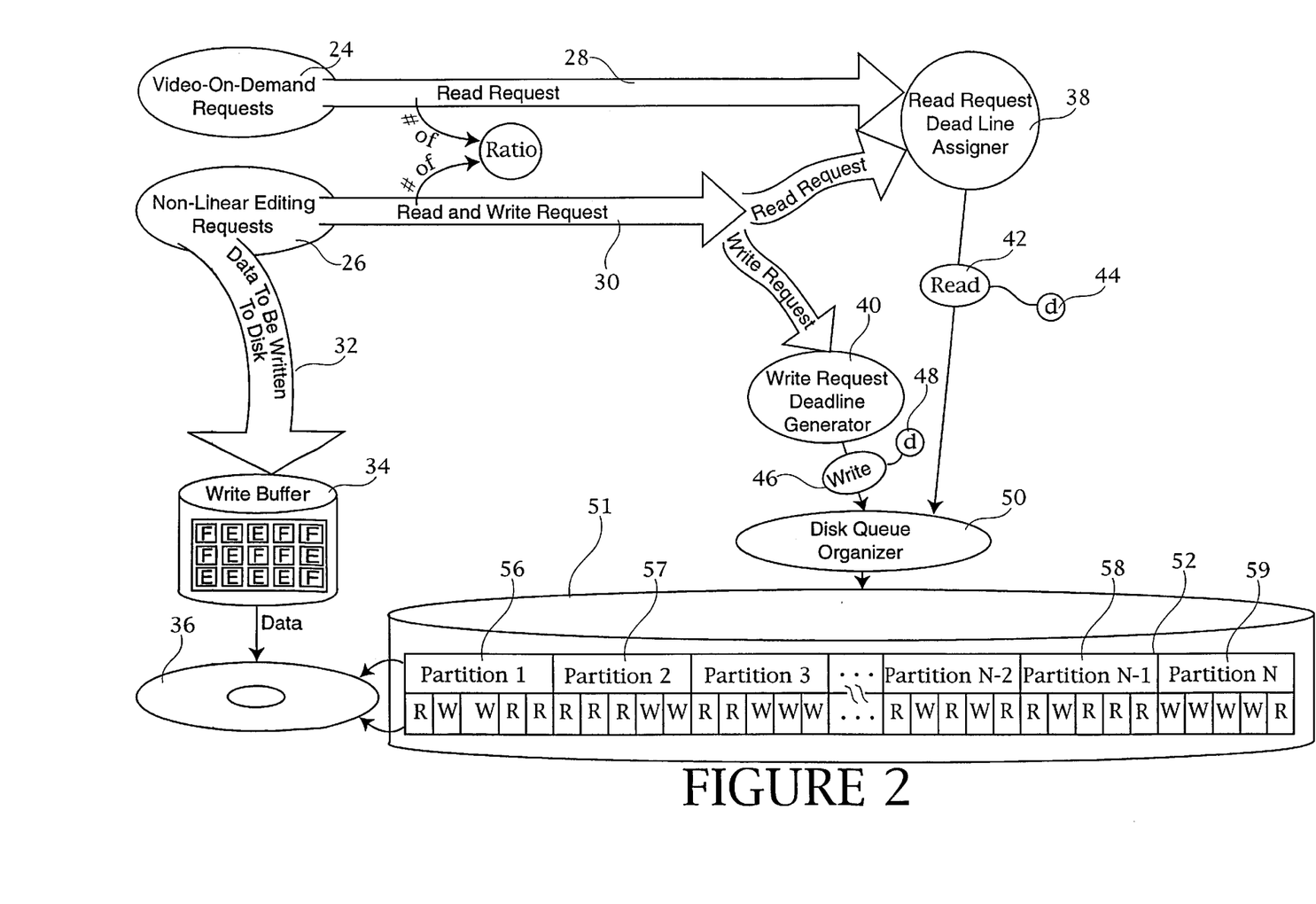
FIG. 2 is a data flow diagram according to the present invention.

FIG. 2 presents the storage device access scheduler of the present invention that receives and processes both video-on-demand 24 and non-linear editing requests 26. As can be seen, the video-on-demand requests 24 are only read requests while the non-linear editing requests comprise both read and write requests 30. The data that are to be written to the disk 32 as part of an editing operation are initially stored in a write buffer 34 until the corresponding request is processed and the data are transferred to the disk 36.

The read requests 28 and read and combined write requests 30 are provided to a read request deadline assigner 38 and to a write request deadline generator 40. Each read request 42 is assigned a deadline 44 by the read request deadline assigner 38 and each write request 46 is assigned a deadline by the write request deadline generator 40. These read and write requests are then inserted into a memory 51 that is a subdivided data structure (or multiple partition queue) 52, by the disk queue organizer 50, with each partition corresponding to an optimal seek path. In this way, violations of both read and write request deadlines are minimized.

Figure 3:
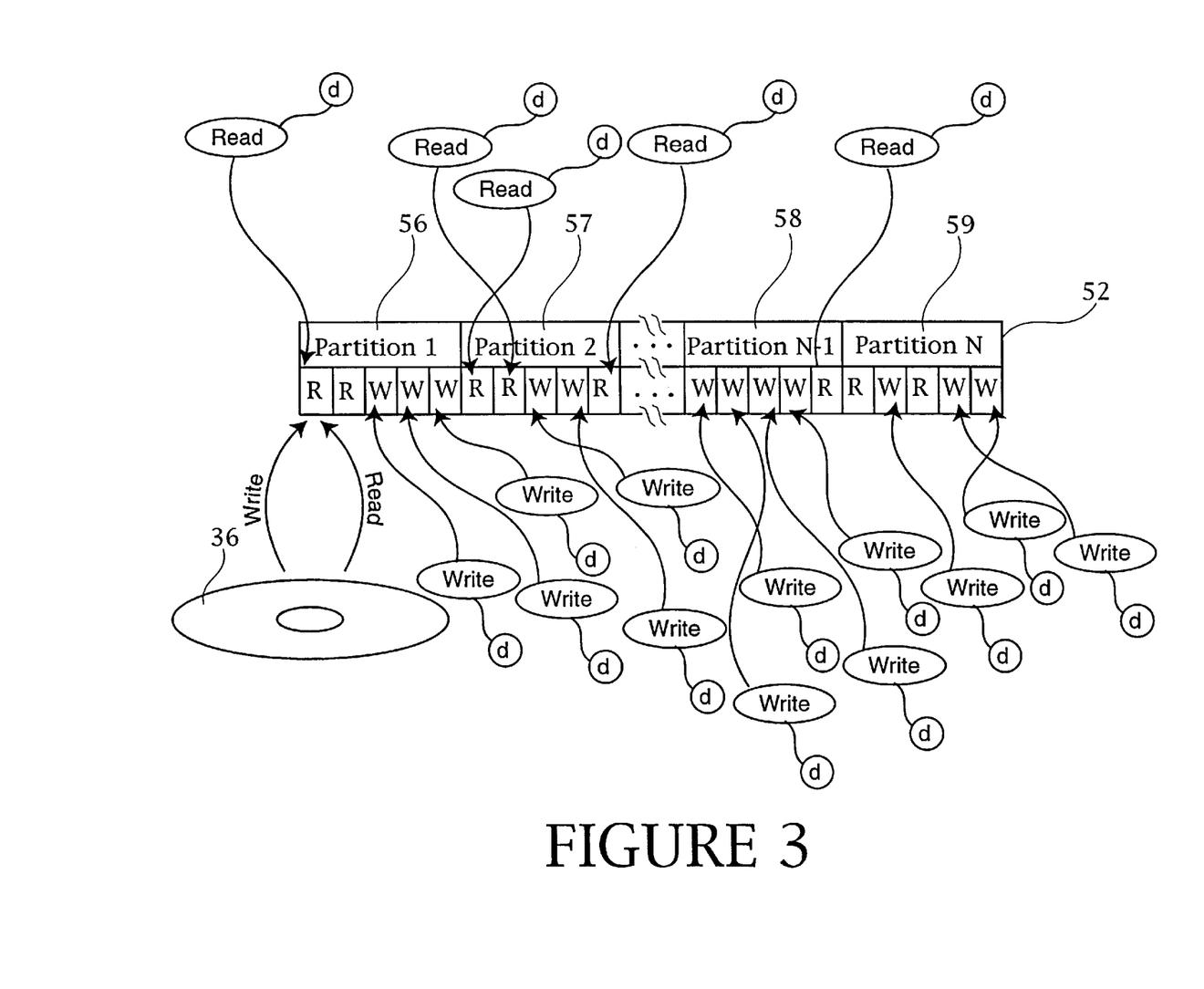
FIG. 3 is a flow chart illustrating the disk scheduling process of the present invention that supports simultaneous disk read and write requests.

As can be seen in FIG. 3, the multiple partitions (56,57, 58,59) of the multiple partitioned queue 52 are sequentially arranged and numbered such that disk requests in partition 1 (56) are processed by the disk server before the disks requests in partition N (59). Thus, requests in partition N will experience the longest delay in the system. With this multiple partition structure and processing technique, two issues need to be addressed. First, how and when are new partitions created or formed, and second, in which partition is an arriving disk read or write request placed.

The disk read and write requests are inserted into the appropriate partitions of the queue according to various rules that are subsequently described in greater detail. However, it is important to mention that based on the nature of the read or write request, the partitions can be examined in front-to-back or back-to-front order. Front-to-back order means that when a request arrives the system starts by examining partition 1, then partition 2, etc., until it finds the first partition that satisfies the insertion condition. On the other hand, back-to-front order implies that the system examines the partitions in the reverse order, i.e., starting with partition N, followed by partition N−1, etc.

Figure 4:
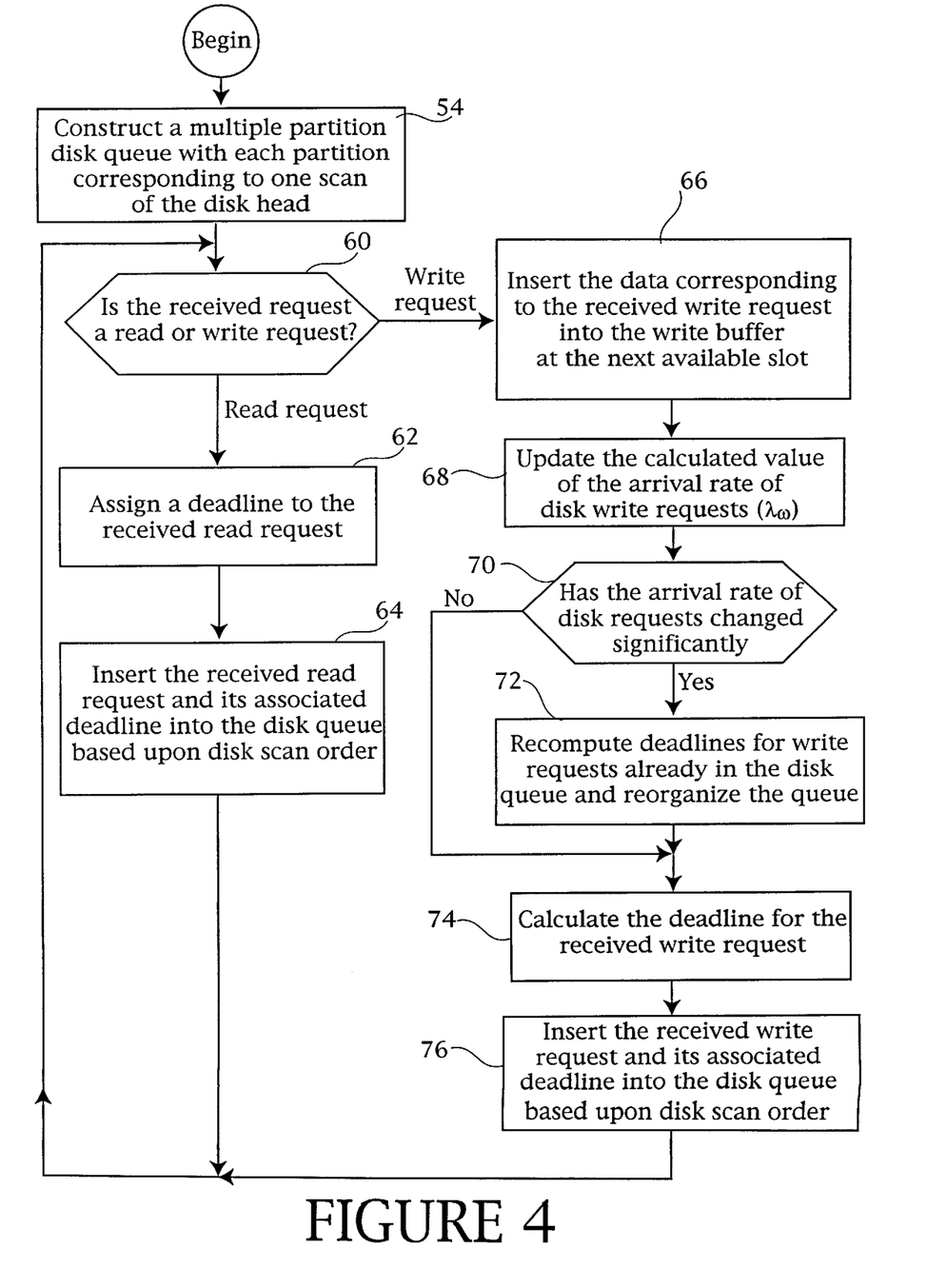
FIG. 4 is an enlarged view of the multiple partition queue.

FIG. 4 shows an overview of the process of the present invention. Initially, a multiple partition queue is constructed with each partition corresponding to one scan or seek path of the storage device or disk (54). The queue partitions hold requests independently of whether the request is a read or write and places all requests in scan order. After the multiple partition queue is constructed (54), an initial determination is made as to whether the received request is a read or write request (60). In the event the request is a read request, the read request deadline assigner assigns a deadline (62). This is followed by the data storage organizer inserting the read request based on the assigned deadline and scan order (64). Both the assignment of the deadline (62) and the insertion procedure (64) will be subsequently described in further detail.

In the event the request is a write request, the data corresponding to the request is inserted into the write buffer at the next available slot (66). Following the insertion of the data into the write buffer (66), the calculated value of the arrival rate of disk write requests ($\lambda_W$) is updated. $\lambda_W$ is an estimate of the time in which the write buffer will be filled, and is used to compute the deadlines for the write requests. Therefore, the accuracy of $\lambda_W$ is important to the performance of the system. It is possible to assume that the value of $\lambda_W$ is constant during disk server execution, and hence is given a priori. However, if $\lambda_W$ is overestimated, then this may result in forming over-restricted deadlines that do not reflect reality. As a result, more read request losses may be experienced. On the other hand, when $\lambda_W$ is underestimated, the system may not take into consideration the congestion in the write buffer. This is because an insufficient number of write requests may be scheduled when their deadlines are overly relaxed. Therefore, the write buffer may fill quickly and bursts of write requests have to occur, thus forcing many consecutive read requests to be lost.

Once the calculated value of $\lambda_W$ has been updated (68), a determination is made whether $\lambda_W$ has changed significantly and thus requires updating prior to calculation of a deadline (70). In the event the disk request has changed significantly, the deadlines for write requests already in the disk queue are recomputed and the queue is reorganized (72). However, if $\lambda_W$ has not changed significantly, no recomputing of deadlines is performed nor is the queue reorganized.

Once the actions or inactions relating to $\lambda_W$ have been completed, the deadline for the received write request is calculated (74) and the request is inserted into the disk queue based upon scan order (76). Based upon this deadline, it can be seen that both read and write requests can be processed and subsequently inserted into the disk queue for processing such that an optimal seek path is maintained for each of the plurality of partitions while minimizing violations of both read and write request deadlines.

With this overview of the process of the present invention in mind, greater detail will be subsequently provided for assignment and calculation of both read and write deadlines, insertion of requests, processing requests, subsequent dynamic computations involving $\lambda_W$, and handling the variations in $\lambda_W$.

Deadline Computation For Write Requests

In a video editing session, write requests are modeled as belonging to the $W_{nn}$ category. $W_{nn}$ write requests have the following characteristics:

1. Any page to be written to the disk is already pre-stored in a main-memory buffer pool.
2. A $W_{nn}$ write request has no real-time deadline. Therefore, it can afford longer delays than read requests.
3. Although it does not have a deadline, a $W_{nn}$ write request cannot be kept indefinitely in main-memory buffers due to the risk of loss in case of a system crash or power failure. It has to be fulfilled sometime in the future to avoid the write buffer pool becoming to full. The longest possible duration that a write request can wait in the buffer before being forcibly flushed into the disk ($Tw_{max}$) a tunable system parameter and is computed based on the value of the mean time between failure.
4. A $W_{nn}$ write request cannot be lost due to system load, etc. A $W_{nn}$ write request has to be fulfilled by the system at some point in time.
5. Based on the system load, the write buffer pool can become full. At this point, some pending $W_{nn}$ write requests have to be flushed to disk, thereby releasing buffer space for newly arriving write requests.

A deadline needs to be imposed on all writes. While the deadlines of $W_{dn}$ and $W_{dl}$ requests are specified by the application, the deadline associated with $W_{nn}$ requests has to be artificially computed by the storage server based on the number of available buffers and the expected arrival rate of write requests ($\lambda_W$).

In order to compute the artificial deadline of a $W_{nn}$ write request, the following parameters are utilized:

1. $N_B$ is the size, in bytes, of the write buffer pool. Note that a larger write buffer is expected to reduce the requirements imposed on the system due to write requests.
2. $p_w$ is the size, in bytes, of a write page. Note that with a value for $N_B$ and $p_w$, we can compute the number of write pages that the write buffer pool can accommodate, which will be denoted by $N_W$.
3. $W_{max}$ is the maximum time that the system allows for a $W_{nn}$ write request to wait in the buffer before being forcibly flushed to the disk.
4. As previously discussed, $\lambda_W$ is the arrival rate of disk requests to the system and is dynamically measured by the system based upon a measurement of the inter-arrival time between write requests or a period of time. Alternatively, $\lambda_W$ may be considered to be constant with a value that is based on the ratio of the number of editors to the number of viewers and for editors, the ratio of the number of read requests to write requests (i.e., ((#of editors)/(total # of users))*((# of write request for editors)/(total # of requests for editors))).

Assuming that at time t, a user requests that a page, say $p_i$ be written into the disk. It is desirable to assign a deadline for page $p_i$ such that it has to be written into the disk before the deadline. We compute the deadline of a $W_{nn}$ write request in the following way. Let $n_w(t)$ be the number of write requests that exist in the buffer at time t, and $n_F(t)$ be the number of free buffer slots in the buffer pool at time t. Then, $$n_F(t) = N_W - n_w(t). \tag{1}$$

In the worst case scenario, because of the $R_{dl}$ read requests, no pages will be written from the write buffer to the disk, and at the same time, new requests will continue to arrive to the write buffer pool at a rate of $\lambda_W$. As a result, at the time the write page $p_i$ arrives to the write buffer pool (due to a new write request), an estimate of the time until the write buffer pool is full (d(t)), can be computed as follows (worst case scenario):

$$d(t) = t + \frac{n_F(t)}{\lambda_W}. \tag{2}$$

Notice that d(t) is in fact the deadline of any page in the write buffer pool at time t, i.e., a global deadline for all of the pages currently in the write buffer. As a result, if any of these pages are physically written into the disk by the scheduling algorithm, the value of d(t) is relaxed in the following manner.

When a portion of $p_i$ is physically written into the disk, it frees one buffer slot in the buffer pool. As a result, the deadline d(t) for all of the pages in the buffer pool is relaxed, i.e., there is now more time until the buffer becomes full. Therefore, d(t) is relaxed as follows. Let $t_o$ be the last time d(t) was modified. Then, $$d(t) \leftarrow t - t_0 + d(t_0) + \frac{1}{\lambda_W}. \tag{3}$$

This is also consistent with the above formulation for d(t), i.e., $$d(t) \leftarrow t - t_0 + d(t_0) + \frac{1}{\lambda_W} \tag{4}$$

$$= t - t_0 + t_0 + \frac{n_f(t_0)}{\lambda_W} + \frac{1}{\lambda_W} \tag{5}$$

$$= t + \frac{n_f(t_0) + 1}{\lambda_W} \tag{6}$$

$$= t + \frac{n_f(t)}{\lambda_W}. \tag{7}$$

Notice that since to is the last time any change in the buffer pool is made, $n_F(t) = n_F(t_o) + 1$ is the new amount of space after the write page has been physically written to the disk. When a write page request arrives, the corresponding page, say $p_i$, is placed in the write buffer pool. In order to insert a write request into the disk queue, a deadline, say $d_w(t)$, must be assigned for $P_i$ that corresponds to global deadline d(t) of the write buffer pool, i.e., $d_w(t) \leftarrow d(t)$. Finally, $P_i$ and its deadline $d_w(t)$ are inserted into the disk queue. As can be appreciated, the write request is inserted into the scan order in a manner similar to the way that the SCAN-RT scheduling algorithm handles read requests. The mechanism by which this is achieved, and the corresponding interplay between read and write requests, is subsequently described.

Deadline Computation For Read Requests

Two types of read requests must be supported, the $R_{dl}$ and $R_{nn}$ read request. The deadline of an $R_{dl}$ request is determined by the video server and is therefore provided as a constant. For example, in order to play a video-on-demand application, the viewer has to see 30 frames per second. This translates to a frame every 33 milliseconds. Assuming that a frame corresponds to a read request, then the deadline for the read request is 33 milliseconds. Therefore, the following description is focused on the $R_{nn}$ read request.

The $R_{nn}$ category of read requests is useful for video editing applications. $R_{nn}$ read requests have the following characteristics.

1. An $R_{nn}$ read request has no real-time deadline. Therefore, this request can afford longer delays than other requests.
2. Although it does not have a real-time deadline, a $R_{nn}$ read request still cannot wait indefinitely. It has to be fulfilled sometime in the future, with the longest possible duration for this request to be held provided as a system parameter which is tunable. For example, the system administrator may decide that the maximum amount of waiting time for an editors read request is 0.5 seconds. In this instance, $Tr_{max}$ is set to 0.5 seconds (i.e., the deadline for $R_{nn}$ requests is 0.5 seconds).

In order to determine an artificial deadline for $R_{nn}$, the following parameters are utilized:

1. $Tr_{max}$ (as previously indicated) is the maximum time that the system allows a $R_{nn}$ request to wait before being forcibly serviced by the disk.
2. $\lambda_r$ is the arrival rate of $R_{nn}$ requests to the system.

For $W_{nn}$ write requests, because of the lack of a deadline, they are considered as a lower priority request than the $R_{dl}$ read request. Similarly, because of the lack of a deadline, $R_{nn}$ read requests are considered as having a lower priority than $R_{dl}$ read requests. However, in contrast to write requests, since $R_{nn}$ read requests have no buffer problems (as long as there is room for the page to be read). We can also consider $R_{nn}$ requests as having less priority than write requests. Therefore, $R_{nn}$ read requests are given the least priority in terms of scheduling.

The time $Tr_{max}$ is observed as the artificial deadline for $R_{nn}$ read requests. In other words, if an $R_{nn}$ read request, say $r_i$, waits in the system for more than $Tr_{max}$ time units, then $r_i$ has to be forcibly processed by the system regardless of the losses incurred by this read.

Inserting a $W_{NN}$ Write Request

As previously indicated, once a write request, say $w_i$, arrives to the disk to be served, the corresponding page is inserted into the write buffer pool at the next available buffer slot, and the write request is assigned a artificial deadline using the previously described technique. Once the deadline has been assigned to the write request, the write request is inserted into the disk queue.

In order to insert the write request $w_i$ into the disk queue, the following steps are performed. In addition to the following description, pseudo code for inserting $W_{nn}$ write requests can be found in Appendix A. First, the determination is made as to which partition of the disk queue the write request $W_i$ gets inserted, and secondly, once the partition is determined, the attempt is made to insert the write request $w_i$ in the appropriate scanned order.

The first step can be achieved by traversing the queue partitions either in a front to back or in a back to front order. For example, in the back to front order, the algorithm starts from the partition $P_n$ (the farthest from the disk server), and attempts to insert $w_i$ into $P_n$ in scan order. If the deadline of $w_i$ is violated, then an attempt is made to insert $w_i$ into partitions $P_{n-1}$, $P_{n-2}$, etc., until the algorithm finds the first partition $P_j$ such that $w_i$ can be inserted into $P_j$ in scan order without having $w_i$'s deadline violated. It is also possible that all partitions, including partition $P_1$, violate the deadline for $w_i$. This is an extreme case and is not expected to happen. However, the action taken in the event of this extreme case will be subscribed below (see Case 5).

In the second step, the scheduling algorithm attempts to insert the new write request $w_i$ in its scan order in the current partition, say $P_j$. During this insertion process, five possible cases might arise:

Case 1: The deadlines of the pending read and write requests (including the new write request) are not violated by this insertion.

Case 2: The deadline of the new write request will not be violated if it is inserted in scan order, but upon insertion, the deadline of some other $R_{nn}$ read requests will be violated.

Case 3: The deadline of the new write request will not be violated if it is inserted in scan order, but upon insertion, the deadline of some other $R_{dl}$ read request will be violated.

Case 4: The deadline of the new write request will not be violated if it is inserted in scan order, but upon insertion, the deadline of some other write request will be violated.

Case 5: The deadline of the new write request will be violated (arises when all of the partitions, including $P_1$, violate the deadline of the new write request).

Case 1 is the simplest to handle and represents the best possible scenario. If the scheduling algorithm finds that it is possible to insert the write request $w_i$ into the queue partition $P_j$ (resulting from traversing the queue partitions in the back to front order) without violating any of the deadlines of the read and write requests that already exist in the queue, as well as the deadline of the new write request $w_i$, then $w_i$ will be inserted in the disk queue in its scan order.

In Case 2, the deadline of the new write request is not violated when it gets inserted in its scan order, but upon inserting it, the deadline of some other $R_{nn}$ read request is violated. Assume that the violated $R_{nn}$ request $r_i$ is in partition $P_l$. In this case, an attempt is made to insert $r_i$ into $P_{l-1}$. If this attempt is successful, without violating any deadlines of other requests, then both of the insertions of $w_i$ and $r_i$ take place. Otherwise, $r_i$ is left in its current location in $P_1$ even though $r_i$'s deadline is violated. This is because $W_{nn}$ write requests have a higher priority than $R_{nn}$ read requests.

In Case 3, the deadline of the new write request ($w_i$) is not violated when it gets inserted in the scan order. But upon inserting it, the deadline of some other $R_{dl}$ read request, say $r_i$ is violated (note that the algorithm can be repeated at this step if the deadline of more than one $R_{dl}$ read request is violated). The algorithm attempts to avoid losing $r_i$. If $w_i$ can be placed at the next partition, in scan order, without getting its own deadline violated, then $w_i$ is placed in this next partition. This may save $r_i$ from being lost, however if moving $w_i$ to the next partition will violate $w_i$'s deadline, then $w_i$ is not moved from its current partition and some $R_1$ requests are identified to pre-empt.

Any $R_{nn}$ read requests that are ahead of $r_i$ in the queue that can be pre-emptied from their location to a partition that is past the location of $r_i$ are sought. If such an $R_{nn}$ read request is found, and moving this read request results in saving $r_i$, then the located request is moved from its location to a location past $r_i$. Otherwise, $w_i$ is inserted into its current location and $r_i$ is lost.

Cases 1–3 constitute the typical scenarios during regular system operation. On the other hand, cases 4 and 5 are extreme cases that happen only when the rate of write requests exceeds the predetermined upper limit at system configuration time. For example, if the system load changes, e.g., (# of editors)/(total number of users) changes, the pre-computed value of $\lambda_w$ is affected and the resulting system performance is poor (cases 4 & 5) and $\lambda_w$ must be recalculated.

It should be noted that when the frequency of cases 4 and 5 becomes significant, this indicates that the request pattern has changed significantly, and that it is time to re-evaluate system parameters, e.g., expanding the size of the write buffer pool. However, while this indicates it is time to re-evaluate the system parameters, cases 4 and 5 must be handled.

In Case 4, the new write request violates the deadline of another write request that already exists in the disk queue. In this case, the algorithm searches for any $R_{nn}$ request to move to a farther location. Since $W_{nn}$ requests have higher priority over $R_{nn}$ requests, a violated $R_{nn}$ request gets pre-empited from the location and is moved to the partitions that are next to their current partitions. If none is found, or if moving the $R_{nn}$ requests will not save the write requests from having their deadlines violated, then all of the write requests that had their deadlines violated are moved to partitions that are ahead in the disk queue, or to the head or the disk queue, if no such partitions exist. As a result of this action, $R_{dl}$ read requests, whose deadlines become violated, are considered lost. As previously indicated, Case 4 (new write requests violating the deadlines of other write requests) represents an extreme situation which indicates that the write buffer pool is getting congested and that the system is getting overloaded. This situation should be avoided by the admission control algorithm of the video server.

In Case 5, the deadline of the new write request will be violated if it is inserted in its scan order. We recall that the deadline of a write request is computed based on the time by which the write buffer will get full. As a result, the write request cannot afford having its deadline violated, as it will result in a buffer overflow and possible loss of write requests. Since $W_{nn}$ pages cannot be lost (by definition), the new write request must be scheduled without violating its deadline. This is achieved as follows. The new write request is placed at a partition that is ahead in the disk queue, or at the head of the queue, if no such partition exists. The read request whose deadline has become violated is considered lost, while the write request whose deadline becomes violated is treated as in case 4, i.e., is moved forward in the queue to another partition or, at worst, to the head of queue, along with the new write request.

In both cases 4 and 5, the write requests that are moved to the head of the queue are ordered among themselves in scan order. Notice that since we are storing absolute deadlines for both read and write requests, upon insertion of the new request, we do not need to update the deadlines of these requests that are past the new request in SCAN order.

Processing a $W_{nn}$ Write Request

In all of the above five cases, once a write page is inserted into the disk queue, it is guaranteed that it will be written physically into the disk, i.e., it does not get deleted from the disk queue.

As previously discussed, writing a page into the disk will result in free buffer space (a space that is occupied by the write page). Therefore, once a page is written into the disk, we can relax the deadline of all of the pages in the write buffer pool, as well as the deadline of the write pages in the disk queue.

We relax the deadline of the pages in the write buffer pool by modifying the global variable d(t), as previously discussed. Similarly, for the disk queue, upon writing a write page into the disk, we apply the following procedure.

Let the current time be $t_o$. Initially, scan the disk queue and locate all of the write requests in the queue. Secondly, for each write request $W_i$ in the disk queue with priority $d_w(t_o)$, where $(t_o)$ is the last time $d_w(t_o)$ is modified, set $d_w(t)$ to:

$$d_W(t) \leftarrow t - t_0 + d_W(t_0) + \frac{1}{\lambda_W} \qquad (8)$$

The reason for this deadline relaxation is due to the requirements of the overall system, and hence reduces the number of read page losses.

Inserting and Processing $R_{dl}$ Read Requests

The handling of an $R_{dl}$ read request is similar to what is being performed in the original SCAN-RT algorithm. In addition to the following description, pseudo code for inserting and processing $R_{dl}$ read requests is contained in Appendix B. When a new $R_{dl}$ read request $r_i$ arrives in the disk queue, a determination is made as to which partition in the disk queue the read request be may inserted, and then the attempt is made to insert the read request in the correct SCAN order within the partition.

Partitions are searched in a front-to-back or a back-to-front fashion, similar to what is described in the case of $W_{nn}$ requests. The searching is performed until the first partition is identified such that the deadline for $r_i$ is not violated if $r_i$ is inserted into partition $P_j$ in scan order. If no such partition exists, then a search is conducted for any $R_{nn}$ requests that can be moved from their location to another location to save $r_i$. If such a $R_{nn}$ request is found, then it is moved and $r_i$ is saved, hence it is inserted into its proper location in scan order. If no such $R_{nn}$ request is found, then $r_i$ is considered lost and is discarded.

Assuming that a partition $P_j$ is found such that $r_i$ can be inserted without having $r_i$'s deadline violated, a check is made to see if the deadline of any of the requests in the queue is violated before inserting the request into that position. This applies to both read and write requests that already exist in the disk queue. If no deadline is violated, then the new $R_{dl}$ read request gets inserted into the disk queue in its scan order. If one (or more) deadline(s) is (are) violated, then a check is made to determine if it will be possible for the new $R_{dl}$ read request to be moved to the next partition in the queue in the case of the front to back scan, or previous partition in the case of the back to front scan, or if any $R_{nn}$ requests can be pre-empited from their location. In either case, if the deadline of the new $R_{dl}$ read request is not violated, then it is inserted in the proper location. Otherwise, the $R_{dl}$ read request is considered lost and is not processed.

It should be noted that one possible optimization scheme is to search for write requests in the queue that can afford to be repositioned at the end of the disk queue without encountering a deadline violation. This repositioning of a write request is performed only if it will result in accommodating the new read request into the read request's scan order and with its deadline met.

Inserting a $R_{nn}$ Read Request

Assume that a new $R_{nn}$ read request, say $r_i$, arrives to the system at time t, and that we want to insert $r_i$ into the disk queue. The deadline of $r_i$ is computed as $t+Tr_{max}$. Based on the deadline of $r_i$, we determine the farthest partition $P_k$ such that inserting $r_i$ into $P_k$ will not violate $r_i$'s deadline, and inserting $r_i$ into $P_k+1$ will violate $r_i$'s dead line (i.e., $P_k$ is the farthest possible location from $r_i$ without violating $r_i$'s deadline). It remains to be shown in which partition ($P_1 \ldots P_K$) $r_i$ is inserted.

One possible option is to insert $r_i$ into partition $P_k$ and let it wait in the queue until it is served by the disk server. However, this is a pessimistic solution and it does not attempt to serve $r_i$ earlier than its maximum deadline. A second solution is to attempt to schedule $r_i$ at an earlier partition $P_k$, as long as it does not violate any other request. More specifically, $r_i$ is inserted into the disk queue in the following manner, as presented in Appendix C.

1. Examine the partitions of the disk queue from front-to-back (or alternately from back-to-front), i.e., starting from partition $P_1, P_2, \ldots, P_K$, where K is selected such that $r_i$ can be safely inserted into $P_K$ without violating its deadline, and violates its deadline if inserted into $P_K+1$.
2. Let the current partition be $p_j$. If J=K, then insert $r_i$ into partition $P_Q$ such that Q is greater than or equal to K and the insertion of $r_i$ into $P_Q$ will not violate any $W_{nn}$ write requests. Discard any $R_{dl}$ requests that have their deadlines violated due to the insertion of $R_{nn}$ into $P_Q$.
3. Else if $r_i$ can be inserted into $P_J$ in scan order without causing any other request in the disk queue to violate the deadlines, then insert $r_i$ in $P_J$.
4. Else inserting $r_i$ into $P_J$ in scan order will cause other requests in the disk queue to violate the deadlines, then consider inserting $r_i$ into $P_J+1$.

It can be seen that if $r_i$ can be inserted into a partition $P_J$ where $0 \leq J, \leq K$ without violating the deadlines of any $R_{dl}$ or $W_{nn}$ requests, then $r_i$ can be inserted safely into $P_J$ (step 3 above). However, if inserting $r_i$ into $P_J$ will violate the deadline of $R_{dl}$ or $W_{nn}$ requests, then consideration is given to insert $r_i$ in a farther partition than $P_J$ (as long as J is strictly less than K). When J equals K, this means that $r_i$'s deadline is about to be violated and hence $r_i$ has to be inserted into the disk queue as early as possible. There is a chance that inserting $r_i$ into $P_K$ will violate either $R_{dl}$ or $W_{nn}$ request. The system discards any $R_{dl}$ request that will have their deadlines violated. However, the problem lies with $W_{nn}$ requests as they cannot be discarded. So, if inserting $r_i$ into $P_K$ will result in violating the deadline of some $W_{nn}$ requests, then $r_i$ is not inserted into $P_K$, and a farther partition $P_Q$ where Q is greater than K, is found such that when inserting $r_i$ into $P_Q$ in scan order will violate the deadline of a $W_{nn}$ request. In other words, because $W_{nn}$ requests have higher priority than $R_{nn}$ requests, the system chooses to violate the deadline of an $R_{nn}$ and not the deadline of a $W_{nn}$ request.

Estimating The Arrival Rate Of Disk Write Requests ($\lambda_W$)

As previously indicated, the accuracy of the value of the arrival rate of disk write requests ($\lambda_w$) is critical to the performance of the system. In order to enhance the system, both dynamic adjustment of $\lambda_W$ and options for handling variations in $\lambda_W$ are provided by the system. It should be noted that both dynamic adjustment and variation handling are enhancements that are orthogonal to each other and either one or both can be incorporated into the system.

Dynamically Computing $\lambda_W$

In order to dynamically compute $\lambda_W$, the running average for $\lambda_W$ is maintained. This accomplished by storing the most recent K values of the inter-arrival times of write requests, maintaining the running average of the most recent K inter-arrival times, and updating the running average each time a new write request arrives to the write buffer.

A new value for $\lambda_W$ is computed each time a new write request arrives to the write buffer. For purposes of the following description, let $\lambda_{W-new}$ be the value of $\lambda_W$ that is computed after the arrival of the most recent write request, and $\lambda_{W-current}$ be the value of $\lambda_W$ that is currently used by the system. Then, $\lambda_{W-new}$ new is computed with every arrival of a new write request, while $\lambda_{W-current}$ is the one used to compute the deadlines of the write request.

$$\lambda_{w-new} = \frac{k}{\sum_{k-1}^{i=0} I_{-i}} \quad (9)$$

Let $I_0, I_{-1}, I_{-2}, \ldots, I_{-(K-1)}$ be the inter-arrival times between the consecutive K +1 most recent write request. Then, the question that arises is when does $\lambda_{W-new}$ become $\lambda_{W-current}$, i.e., when is $\lambda_{W-new}$ used by the system to recompute the deadlines of the write request. A simple solution is to update the value of $\lambda_{W-current}$ each time a new write request arrives in the write buffer.

Once $\lambda_{W-current}$ is assigned a new value, new deadlines will have to be computed for the write requests, and it is quite possible that the queue order will require modification based on the new deadlines. The problem with updating the value of $\lambda_{W-current}$ each time a new request arrives is that this approach may induce significant system overhead although the change in $\lambda_{W-current}$ may not be significant. On the other hand, it is advantageous for the value of $\lambda_{W-current}$ to closely follow the real changes in $\lambda_W$, in order to be able to compute realistic deadlines for the write requests and avoid underestimating or overestimating their values to reflect the change of $\lambda_W$ only when the change is significant.

There are several ways to detect significant changes in the value of $\lambda_W$. One way is to adopt a thresholding scheme where $\lambda_{W-current}$ is not updated with $\lambda_{W-new}$ unless the change in the running average of $\lambda_W$ becomes greater than a certain threshold $\Sigma$, i.e. when $|\lambda_{W-current} - \lambda_{W-new}| < \Sigma$. This thresholding mechanism is proposed in order to tolerate the temporary fluctuations in the value of $\lambda_W$.

Handling The Variations In $\lambda_W$

Once it is determined that $\lambda_W$ has changed significantly from the running average, the system performs the following actions: 1) The write request deadlines are recomputed, and 2) if required, the order of the read and write requests in the disk queue are reorganized based on the new deadline calculation.

Given the new value for $\lambda_{W-current}$, computing the new deadlines for the write requests that are in the disk queue (step 1) is straight-forward. Simply, we followed the same steps as previously described in the section titled Deadline Computation for Write Requests.

Step 2 can be handled in several ways based on whether the new $\lambda_W$ is higher or lower than the previously estimated one. This is also reflected in the new priorities of the write request. There are two cases to consider. Case 1 is when the write priority is relaxed, and Case 2 is when the write priority is tightened. Case 1 arises when $\lambda_{W-current} - \lambda_{W-new} \geq \Sigma$, while case 2 arises when $\lambda_{W-new} - \lambda_{W-current} \leq \Sigma$. Several appropriate actions are possible in each of these cases that may affect the performance of the system.

When the deadline of the write request is relaxed (case 1), two options are available. Option one involves migrating the write request that already exists in the disk queue to the next scan order. The reason for this is to enhance the performance of the system by reducing the number of losses of $R_{dl}$. This migration process can be achieved utilizing the following procedure. For each write request $W_{nni}$ that resides in the scan order of partition P, which is the partition closest to the head of the disk queue, perform the following:

1. Check to determine if a partition $P_i+1$ exists in the disk queue.
2. If $P_i+1$ exists and if $W_{nni}$ can be inserted into $P_i+1$ in scan order without violating $W_{nni}$'s new relaxed deadline, then insert $W_{nni}$ in the appropriate scan order position in $P_i$, otherwise keep $W_{nni}$ in its current position in $P_i$. Note that the insertion of $W_{nni}$ into $P_i+1$ cannot violate any other requests in the queue since $W_{nni}$ was already in the disk queue before migrating it. Therefore, with the existence of $W_{nni}$ in the queue, all of the items that followed $W_{nni}$ in the queue already have their deadline satisfied.

3. If $P_i+1$ does not exist (i.e., $P_i$ is the last partition in the disk) and if $W_{nni}$ can be inserted at the end of $P_i$ without violating $W_{nni}$'s new deadline, then create a new partition of $P_i$ and insert $W_{nni}$ into it, otherwise keep $W_{nni}$ in its current location in $P_i$.

The second option is to update the deadline of write requests that are in the disk queue, but do not migrate the write requests backwards in the disk queue, i.e., leave them in their current locations in the disk queue. In other words, the new relax deadline will only effect the positioning of the new arriving write requests, but not the ones already existing in the queue. This option can be achieved by traversing the disk queue, locating the write requests in the queue, and updating the deadlines. The advantage of this option is the reduced overhead induced with the task associated when the value of $\lambda_W$ changes, as the write requests do not have to be relocated after changing their deadlines. Moreover, relaxing the deadlines of the write requests that already exist in the disk queue will allow more read requests to be scheduled ahead of these write requests, and hence provides better performance on the video server.

The last option which will be provided is to take no action, i.e., do not update the deadlines of the write requests that already exist in the disk queue and do not change their location. In other words, the change $\lambda_W$ will only effect the new arriving rate request. This option represents the least overhead induced by the system.

Traffic Smoothing of Write Requests

As can be seen from the previous sections, the $R_{dl}$ read requests are handled regularly, until a write request arrives. The write buffer pool is used to ensure that the burst effect of write requests is smooth and is transferred into a steady stream of requests of a fixed rate. Every effort is made to schedule write requests along with $R_{dl}$ read requests as long as it is possible to schedule such write requests without conflicting with any read requests.

There are two situations that would result in having the write buffer pool completely fill. This happens when the system is unable to schedule enough write requests to be served in the disk queue. It may also happen when there is an error in estimating the arrival rate of write requests to the write buffer. If the arrival rate is under-estimated, then an over-relaxed deadline for the write requests is computed. This results in scheduling less write requests then needed, and hence the write buffer pool may get filled.

When the write buffer pool becomes full, some space must be freed in the write buffer to accommodate the arrival of new write requests. In order to avoid a burst of writing pages from the buffer to the disk, hence losing many contiguous read requests ($R_{dl}$ requests), the following is performed.

Based on the mixed ratio between editing and viewing, the frequency of execution of the traffic smoothing procedure is computed. Each time this procedure is executed, it forces some write requests in the disk queue to be fulfilled and hence freeing some pages in the write buffer. This assists in avoiding the case where a burst of write requests are flushed to disk when the write buffer gets full. The most critical performed measure here is how much traffic smoothing can enhance the distribution of the inter-arrival time of the event of losses of read requests.

Conclusion

At least one advantage of the new read/write scheduling process is that it treats both read and write requests in a homogenous manner in terms of deadlines and placing them, as much as possible, in scan order. Furthermore, artificial, but practical deadlines for write requests are assigned which is a function of the amount of available write buffers and the arrival rate of the write requests. Therefore, all the requests (mixture of reads and writes) are serviced, whenever possible, by the disk and scan order. This directly leads to improve quality of service, or alternatively, better throughput for a given QOS.

From the invention as described, it will be obvious that the same may be varied in many ways. Such variations are not to be regarded as a departure from the spirit and scope of the invention, and all such modifications as would be obvious to one skilled in the art or intended to be included within the scope of the following claims.

Appendix A

Pseudocode for Inserting $W_{nn}$ Write Requests

Determine which Partition of Disk Queue to Insert New Write Request Into

Traverse queue partitions (either front-to-back or back-to-front order) and attempt to insert new write request into scan order as follows:

Attempt to insert new write request into partition farthest from disk server ($P_n$);

If deadline violated then attempt to insert into partition next closer to disk server ($P_{n-1}$), keep attempting to insert at still closer partitions ($P_{n-2}$, $P_{n-3}$ . . . ) until deadline is not violated;

If deadline cannot be satisfied in any partition (even $P_O$) then do the following:

Place new write request at partition that is ahead in the disk queue or at the head of the queue if no such partition exists (this corresponds to Case 5 below);

Insert new write request into partition in appropriate scan order;

Insert write request in its scan order in the current partition

Evaluate Possible Resulting Cases

Case 1: the deadline of none of the pending read and write requests (including new write request) is violated by this insertion.

Case 2: the deadline of the new write request will not be violated if it is inserted in scan order, but upon insertion, the deadline of some other $R_{nn}$ read request (s) will be violated.

Case 3: the deadline of the new write request will not be violated if it is inserted in scan order, but upon insertion, the deadline of some other $R_{dl}$ read request(s) will be violated.

Case 4: the deadline of the new write request will not be violated if it is inserted in scan order, but upon insertion, the deadline of some other write request(s) will be violated.

Case 5: the deadline of the new write request will be violated.

Handle the Possible Cases as Follows

Case 1: insert the new write request in scan order into the disk queue at partition determined above ($P_j$).

Case 2: insert the violated $R_{nn}$ in scan order into a closer partition ($P_{j-1}$) and insert new write request in the disk queue at partition determined above ($P_j$).

Case 3: insert new write request in the disk queue at partition later than determined above ($P_{j-1}$) unless that will violate the new write request's deadline; if new write request's deadline is violated, try to locate a different $R_{nn}$ to preempt, write the preempted $R_{nn}$ to a later partition; if doing so will save the violated read request $R_{nn}$, otherwise the violated read request $R_{nn}$ is lost.

Case 4: revise system parameters to expand size of Write Buffer Pool.

Case 5: place new write request at partition that is ahead in the disk queue or at the head of the queue if no such partition exists.

Appendix B

Pseudocode for Inserting and Processing $R_{dl}$ Read Requests

Determine which Partition of Disk Queue to Insert New Read Request Into
    Traverse queue partitions (either front-to-back or back-to-front order and attempt to insert new read request into scan order as follows:
        Attempt to insert new read request into partition farthest from disk server ($P_n$);
        If deadline violated then attempt to insert into partition next closer to disk server ($P_{n-1}$), keep attempting to insert at still closer partitions ($P_{n-2}, P_{n-3}\ldots$) until deadline is not violated;
        If deadline cannot be satisfied in any partition (even $P_O$) then do the following:
            Search for any $R_{nn}$ read request that can be moved from its location to another location to save the new read request;
            If a $R_{nn}$ request is identified that can be moved, move this $R_{nn}$ request and proceed with inserting the new read request in the proper scan order;
            If a $R_{nn}$ request cannot be found, discard the new read request as it is considered lost;
    Process the new read Request;
        Verify that the deadline of any of the other read or write requests in the identified queue is not violated before inserting the new read request into scan order;
        If no deadline is violated, insert the new read request in its scan order in the current partition;
        If a deadline is violated, determine if it is possible to place the new read request in the next partition (in the case of a front-to-back scan) or previous partition (in the case of a back-to-front scan) or if any other $R_{nn}$ request may be pre-empted;
        If the new read request or any other $R_{nn}$ request may be preempted, insert the request(s) into their proper positions;
        If the new read request or any other $R_{nn}$ request cannot be inserted elsewhere, discard the new request as it is considered lost;

Appendix C

Pseudocode for Inserting $R_{nn}$ Read Requests

Determine which Partition of Disk Queue to Insert New Read Request
    Traverse queue partitions (either front-to-back or back-to-front order) and identify the partition that the new read request may be inserted as follows:
        Identify the partition ($P_k$) that the deadline of the new read request is not violated but would be violated in the next partition ($P_{k+1}$);
    Traverse queue partitions (either front-to-back or back-to-front order) and determine the earliest partition that the new read request may be inserted without violating the deadlines of any $R_{dl}$ and $W_{nn}$ as follows;
        let the current partition be ($P_j$);
            if j=k then insert the new read request into a partition ($P_q$) such that q is greater than or equal to k and inserting the new read request will not violate any $W_{nn}$ requests and discard any $R_{dl}$ requests that have their deadlines violated due to the insertion of the new request into $P_q$;
                else if the new request can be inserted into $P_j$ in scan order without causing any other requests in the disk queue to violate their deadlines, then insert the new request into $P_j$;
                else if inserting the new request into $p_j$ in scan order will cause other requests in the disk queue to violate their deadlines, then determine if the new read request may be inserted into the next partition ($P_{j+1}$).

What is claimed is:

1. A method of supporting the processing of simultaneous read requests and write requests of a storage device in the presence of real-time requirements that are associated with these requests, comprising the steps of:

constructing a storage device data structure with a plurality of partitions that correspond to a plurality of seek paths, the storage device data structure storing both read requests and write requests;

generating read request deadlines for the read requests that are based at least in part on a user-desired response time for handling the read requests;

generating write request deadlines for the write requests that are based at least in part on the capacity of a write buffer that stores data associated with the write requests until the data is written to the storage device; and     placing the read requests and the write requests within the storage device data structure based at least in part on the read request deadlines and write request deadlines, such that an optimal seek path is maintained for each of the plurality of partitions while minimizing violations of the read request deadlines and write request deadlines.

2. The method of claim 1 wherein the write request deadlines are based at least in part on an estimate of the time in which the write buffer will become full ($\lambda_W$).

3. The method of claim 2, further comprising the step of dynamically computing $\lambda_W$.

4. The method of claim 3, wherein the step of dynamically computing $\lambda_W$ includes maintaining a running average of computed values of $\lambda_W$.

5. The method of claim 3, further comprising the step of regenerating the write request deadlines when $\lambda_W$ has changed beyond a predetermined threshold.

6. The method of claim 5, further comprising the step of reorganizing the placement of the read and write requests based upon the regenerated write request deadlines.

7. An article of manufacture for supporting the processing of simultaneous read requests and write requests of a storage device in the presence of real-time requirements that are associated with these requests, comprising:

a memory for storing data that is accessed by an application program being executed by a multimedia system;

a data structure stored in said memory that contains data corresponding to both read requests and write requests of said storage device, said data structure including:

a plurality of partitions that subdivide said data structure and that correspond to a plurality of seek paths of said storage device;

a plurality of read request data stored in said data structure, said plurality of read request data having read request deadlines that are based at least in part on a user-desired response time for handling the read request; and a plurality of write request data stored in said data structure, said plurality of write request data having write request deadlines that are based at least in part on the capacity of a write buffer that stores data associated with the write requests until the data is written to the storage device, whereby said plurality of read request data and write request data are organized in said data structure such that an optimal seek path is maintained for each of said plurality of partitions while minimizing violations of said read request deadlines and write request deadlines.

8. The article of manufacture of claim 7, further comprising a storage device access scheduler that receives said read and write requests, calculates said read request deadlines, calculates said write request deadlines, and places each of said read and write requests within said data structure.

9. The article of manufacture of claim 8, wherein said storage device access scheduler includes a write request deadline generator that receives said write requests and calculates said write request deadlines.

10. The article of manufacture of claim 8, wherein said storage device access scheduler includes a read request deadline assigner that receives said read requests and calculates said read request deadlines.

11. The article of manufacture of claim 9, wherein said storage device access scheduler includes a data storage organizer that places each of the read and write requests within the queue data structure such that an optimal seek path is maintained for each of the plurality of partitions while minimizing violations of the read and write requests deadlines.

12. A storage device access scheduler for supporting video-on-demand and non-linear editing of a storage device in the presence of real-time requirements that are associated with the read requests and write requests of video-on-demand and non-linear editing, comprising:

a memory having a storage device data structure with a plurality of partitions that correspond to a plurality of seek paths, the storage device data structure storing both read requests and write requests;

a read request deadline assigner for generating read request deadlines for the read requests that are based at least in part on a user-desired response time for handling the read requests;

a write request deadline assigner for generating write request deadlines for the write requests that are based at least in part on the capacity of a write buffer that stores data associated with the write requests until the data is written to the storage device; and a disk queue organizer for placing the read requests and the write requests within the storage device data structure based at least in part on the read request deadlines and write request deadlines, such that an optimal seek path is maintained for each of the plurality of partitions while minimizing violations of the read request deadlines and write request deadlines.

13. The storage device access scheduler of claim 12 wherein the write request deadlines are based at least in part on an estimate of the time in which the write buffer will become full ($\lambda_W$).

14. The storage device access scheduler of claim 13, wherein $\lambda_W$ is dynamically computed.

15. The storage device access scheduler of claim 13, wherein said write request deadline assigner regenerates the write request deadlines when $\lambda_W$ has changed beyond a predetermined threshold.

* * * * *